United States Patent [19]

Foster

[11] Patent Number: 5,529,071

[45] Date of Patent: Jun. 25, 1996

[54] INCREASING DYNAMIC RANGE WITH A BARREL SHIFTER

[75] Inventor: Steven G. Foster, Greenfield, Wis.

[73] Assignee: General Electric Company, Milwaukee, Wis.

[21] Appl. No.: 343,318

[22] Filed: Nov. 22, 1994

[51] Int. Cl.⁶ ........................................................ A61B 8/00

[52] U.S. Cl. ........................................ 128/660.07; 348/163

[58] Field of Search .......................... 128/660.01, 660.07, 128/660.08; 348/163, 441, 442

[56] References Cited

U.S. PATENT DOCUMENTS 4,581,636   4/1986   Blaker et al. ............................ 348/163

*Primary Examiner*—George Manuel
*Attorney, Agent, or Firm*—B. Joan Haushalter; John H. Pilarski

[57] ABSTRACT

A method for increasing dynamic range of ultrasound imaging signals uses a barrel shifter. The barrel shifter shifts large bit two's complement input data into a standard size bit two's complement output. The method, then, comprises the steps of reducing a large data bus to a smaller data bus, and dynamically changing the amount of reduction. The bus reduction is achieved using a barrel shifter. Since time gain compensation (TGC), used to compensate for diminishing echo strength, increases with the depth of the signal, the amount of shift is directly related to the TGC value.

2 Claims, 1 Drawing Sheet

INCREASING DYNAMIC RANGE WITH A BARREL SHIFTER

TECHNICAL FIELD

The present invention relates to ultrasound imaging and, more particularly, to increasing the dynamic range of ultrasound imaging signals using a barrel shifter.

BACKGROUND ART

Ultrasonic echoes from deliberately launched diagnostic sound waves into tissue are attenuated in proportion to the distance that the sound waves must travel to reach the reflector, plus the distance that the resulting echoes must travel back to reach the receiver. Since sound waves are attenuated as they pass through the human body, the deeper the penetration, the greater the attenuation. Consequently, the strength of the received echoes becomes weaker with increasing depth and time. This is undesirable because it limits the ability of the system to detect the echo strength, i.e., the range over which the echoes can be heard.

To compensate for the diminishing echo strength, most medical ultrasound systems use some sort of Time Gain Compensation (TGC). Since the attenuation rate increases proportionally to the depth of the signal received, the time gain compensation must compensate for a reduced signal as the sound waves penetrate deeper into the body and are returned to the receiving transducers. TGC is a method of increasing the receiver gain as echoes are received from deeper tissues or equivalently with time. Existing TGC's are analog, since the architecture of existing medical ultrasound systems is analog. However, ultrasound imaging systems are being developed which include digital architecture.

Bit width on digital ultrasound signals can be higher than standard digital signal processing (DSP) integrated circuits support. The large bit width is needed to accommodate the large dynamic range that ultrasound signals have. Typically the signal begins large and diminishes as time passes. Commercially available hardware will not support a large bus width, only a standard bus width. Any deviation from standard size, then, is very expensive.

It would be desirable then to have a means for providing the large dynamic range needed for ultrasound signals without using a large bus width.

SUMMARY OF THE INVENTION

The present invention provides a means for increasing the dynamic range of a standard bus width to accommodate the large dynamic range needed for ultrasound signals. A large bus width, then, can be reduced to a standard width.

In accordance with one aspect of the present invention, a method for increasing dynamic range of ultrasound imaging signals comprises the steps of reducing a large data bus to a smaller data bus, and dynamically affecting the amount of reduction. A barrel shifter is used to reduce the data bus size, and the TGC is used to dynamically change the amount of the reduction.

Accordingly, it is an object of the present invention to reduce the large bus width needed to accommodate ultrasound signals to a standard width. It is a further object of the present invention to increase the dynamic range of the standard bus width. Finally, it is an object of the present invention to dynamically affect the amount of reduction of the large data bus to the standard size data bus.

Other objects and advantages of the invention will be apparent from the following description, the accompanying drawings and the appended claims.

DETAILED DESCRIPTION OF THE PREFERRED EMBODIMENTS

The present invention is adaptable for use on a medical ultrasound imaging apparatus, particularly when the bus width on digital ultrasound signals is higher than standard digital processing integrated circuits support. In accordance with the present invention, the large bus width needed to accommodate the large dynamic range that ultrasound signals have is reduced to a standard bus width, thereby increasing the dynamic range of ultrasound imaging signals. Ultrasound signals are transmitted and received, and the present invention increases the dynamic range of the received, or echo, signals, without requiring a corresponding increase in the bus width.

Figure 1:
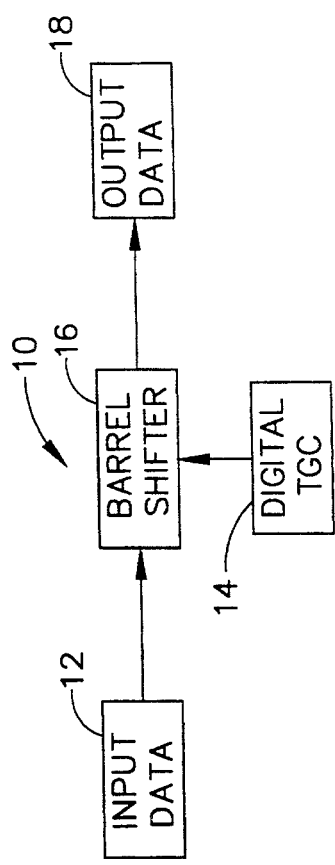
FIG. 1 is a schematic block diagram of the digital gain portion of a digital signal receiving path of an ultrasound machine.

Referring now to the drawings, FIG. 1 illustrates a digital gain portion 10 of a digital signal receiving path of an ultrasound machine. Input data from block 12, comprised of ultrasound or echo signals, and a TGC signal from block 14, are provided to a shifter 16. In accordance with the present invention, the shifter 16 comprises a barrel shifter, capable of accepting a plurality of bits and shifting the plurality of bits simultaneously and to any number of positions. Both left and right shifts are permitted. The barrel shifter 16 shifts the twenty-one-bit two's complement input data into a sixteen-bit two's complement output 18 of FIG. 1, as illustrated by both FIGS. 1 and 2.

In accordance with the present invention, the amount of shift is dynamically changed in time by the TGC value. As the TGC value increases with depth, more shift occurs because the signals are getting smaller. At greater signal depths, there is less activity of the upper bits of the twenty-one-bit bus, and activity moves to the lower bits to extract sixteen bits. Consequently, the amount of shift is directly related to the TGC value.

Figure 2:
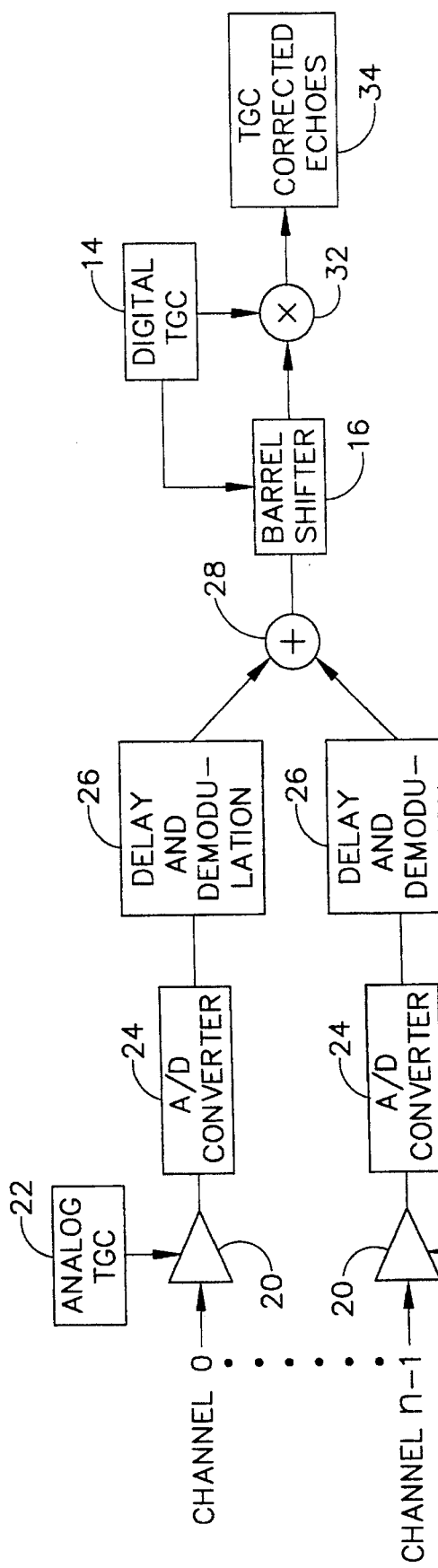
FIG. 2 is a schematic block diagram illustrating a receiver and beam forming portion of an ultrasound machine.

Referring now to FIG. 2, there is illustrated a receiver and beam forming portion of an ultrasound machine. In FIG. 2, each one of multiple channels representing ultrasound echo signals are input to an associated amplifier 20, along with an analog TGC signal 22. In a preferred embodiment of the present invention there are 127 channels, so Channel N-1 in FIG. 2 equals 127, or $2^7-1$. The output of each amplifier 20 is applied to an analog to digital converter 24 and are subsequently delayed and demodulated at block 26. The amplified, converted, delayed and demodulated ultrasound echo signals are focused at adder 28, before being applied to barrel shifter 16. A digital TGC signal from block 30 is also applied to the barrel shifter 16, and multiplied with the output of barrel shifter 16 at multiplier 32, thereby providing TGC corrected ultrasound echo signals ar block 34.

The invention has been described in detail with particular reference to certain preferred embodiments thereof, but it will be understood that modifications and variations can be effected within the spirit and scope of the invention.

I claim:

1. A method for increasing dynamic range of ultrasound imaging signals comprising the steps of:

shifting a large data bus input data into a smaller data bus output data;

dynamically changing the amount of shift by directly relating the amount of shift to a time gain compensation value.

2. A method as claimed in claim 1 wherein the step of shifting a large data bus input data into a smaller data bus output data comprises the step of using a barrel shifter.

* * * * *